United States Patent
Arhab

[11] Patent Number: 6,079,530
[45] Date of Patent: Jun. 27, 2000

[54] HYDROKINETIC COUPLING APPARATUS, PARTICULARY FOR A MOTOR VEHICLE

[75] Inventor: Rabah Arhab, Saint-Brice-S/Foret, France

[73] Assignee: Valeo, Paris, France

[21] Appl. No.: 08/765,288

[22] PCT Filed: May 10, 1996

[86] PCT No.: PCT/FR96/00711

§ 371 Date: Jan. 13, 1997

§ 102(e) Date: Jan. 13, 1997

[87] PCT Pub. No.: WO96/35890

PCT Pub. Date: Nov. 14, 1996

[30] Foreign Application Priority Data

May 11, 1995 [FR] France .................................. 95 05821

[51] Int. Cl.[7] .............................. F16D 33/00; F16H 45/02
[52] U.S. Cl. ...................................... 192/3.29; 192/109 R
[58] Field of Search .................................. 192/3.28, 3.29, 192/3.3, 109 R, 70.18

[56] References Cited

U.S. PATENT DOCUMENTS

| | | | |
|---|---|---|---|
| 2,694,478 | 11/1954 | Zeidler | 192/70.18 |
| 4,353,444 | 10/1982 | Bionaz | 192/70.18 X |
| 4,655,331 | 4/1987 | Naudin | 192/109 R X |
| 4,926,988 | 5/1990 | Kundermann | 192/3.3 |
| 5,211,270 | 5/1993 | Tamura et al. | 192/109 R X |
| 5,477,950 | 12/1995 | Maloof | 192/3.29 |
| 5,480,012 | 1/1996 | Polubinski | 192/3.29 |
| 5,667,043 | 9/1997 | Dehrmann et al. | 192/3.29 |

FOREIGN PATENT DOCUMENTS

| | | |
|---|---|---|
| 2634849 | 2/1990 | France . |
| 2678342 | 12/1992 | France . |
| 2695975 | 3/1994 | France . |
| 2726620 | 1/1997 | France . |
| 4306598 | 9/1994 | Germany . |
| 94/07058 | 3/1994 | WIPO . |

*Primary Examiner*—Charles A. Marmor
*Assistant Examiner*—Saúl Rodríguez
*Attorney, Agent, or Firm*—Liniak, Berenato, Longacre & White

[57] ABSTRACT

A hydrokinetic coupling device includes a piston (9) displaceable in an axial direction along a guide ring (6) mounted on a transversal wall (2). Stops (50) are provided on the wall (2) to limit the displacement of the piston (9).

6 Claims, 3 Drawing Sheets

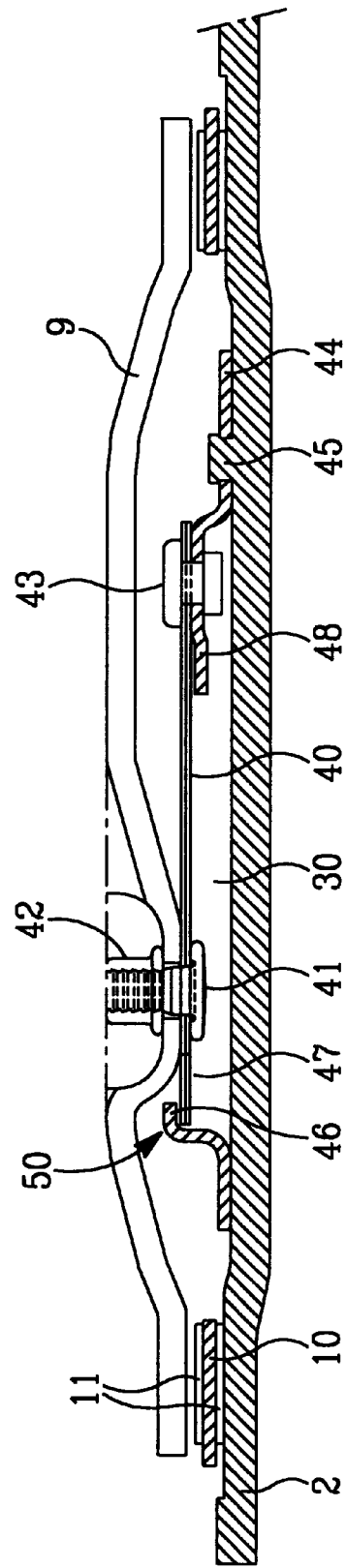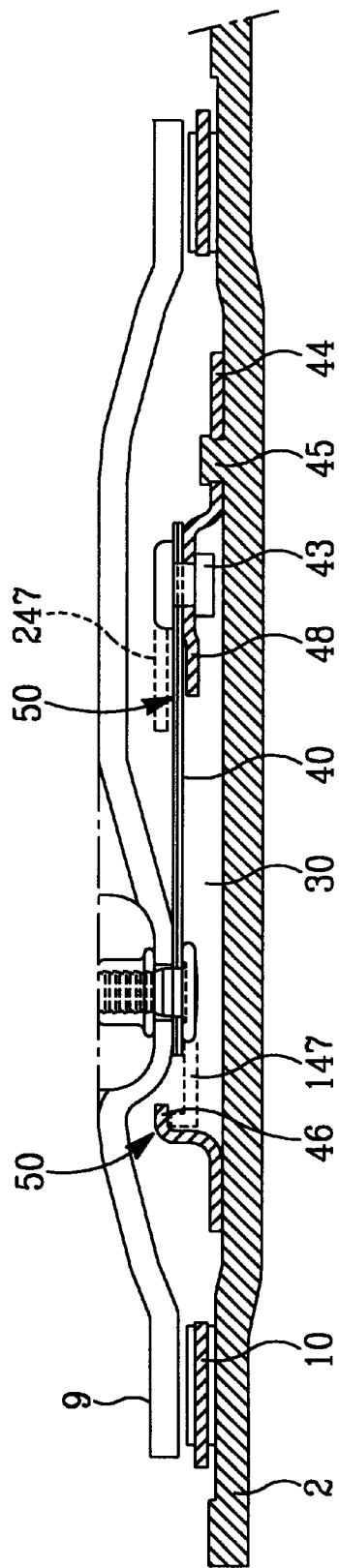

HYDROKINETIC COUPLING APPARATUS, PARTICULARY FOR A MOTOR VEHICLE

The present invention relates to hydrokinetic coupling apparatus, especially for motor vehicles, such as is described in the document WO-A-94/07058.

This apparatus comprises a wall which is orientated generally transversely, and which is adapted to be coupled in rotation to a driving shaft and carries a guide ring fixed centrally on the said wall. This wall is part of a housing which surrounds a turbine wheel that is fixed in rotation to a driven shaft.

A piston is sealingly mounted for axial movement along the said ring, and defines, with the wall and the ring, a variable volume chamber which is bounded on the outside by a disc and by friction liners, which are adapted to be gripped, respectively, between the piston and the disc, and between the disc and the wall.

Each friction liner is fixed to one of the elements consisting of the disc and, respectively, the piston and the transverse wall between which it is adapted to be gripped.

The transverse wall becomes inflated outwardly when the hydrokinetic coupling apparatus is driven in rotation by the driving shaft, due to the presence of oil in the housing which constitutes a casing.

More precisely, the transverse wall swells to a greater extent in the centre than in the region of the friction liners.

As a result, the guide ring, fixed to the transverse wall, follows the movement of the latter so that a relative movement occurs between the piston and the guide ring, with the disadvantage that a poor surface area is then offered to the piston. This piston may even escape from the guide ring.

In general terms, the piston can, following the above mentioned inflation effect, cease to cover the sealing ring which is interposed between the latter and the guide ring, when the lock-up clutch is disengaged.

It should be emphasised that ram-like impacts also occur, so that relative displacement is produced between the piston and the guide ring.

In addition, it is desirable to reduce axial size in the region of the guide ring.

An object of the present invention is to overcome these drawbacks in a simple and inexpensive way, and to respond to this requirement.

In accordance with the invention, abutment means, facing towards the transverse wall and carried by the transverse wall, are provided for limiting the movement of the piston in a direction away from the transverse wall.

Thanks to the invention, the relative displacement effects between the piston and the guide ring are reduced.

The piston follows the movement of the transverse wall, and the axial size is reduced in the region of the guide ring.

The said guide ring offers a good surface area to the piston under all circumstances, so that the piston is thus unable to escape from the latter when the lock-up clutch is disengaged (or separated). This abutment thus limits the movement of the piston towards the turbine wheel.

Thus the piston runs no risk of interfering with the hub of the turbine wheel, or with a radial web of a torsion damper.

The abutment means in accordance with the invention enable the sealing ring to be protected, by ensuring that it is covered under all circumstances, for example by the piston. The variable volume chamber is thus always sealed.

In addition, the axial displacement of the piston between the positions in which the lock-up clutch is disengaged (or separated), and in which the lock-up clutch is engaged (or bridged), is minimised, so that the response times are reduced.

The said abutment thus enables the tangential resilient tongues to be preserved (by limiting the deflection of the latter), these tongues being interposed in certain embodiments between the piston and the transverse wall so as to couple the piston in rotation with the said transverse wall, while leaving the possibility for axial movement of the piston to take place.

The abutment means may be mounted in the said chamber and be formed in a drive member, which is fixed to the transverse wall and which serves for fastening of the tangential tongues, which in this case are interposed between the piston and the said member.

This arrangement is favourable to the reduction in axial size between the guide ring and the hub to which the turbine wheel is fixed.

The following description illustrates the invention with reference to the attached drawings, in which:

FIG. 3 is a view taken on the line 3—3 in FIG. 2;

FIG. 4 is a view similar to FIG. 3, for another embodiment.

Figure 1:
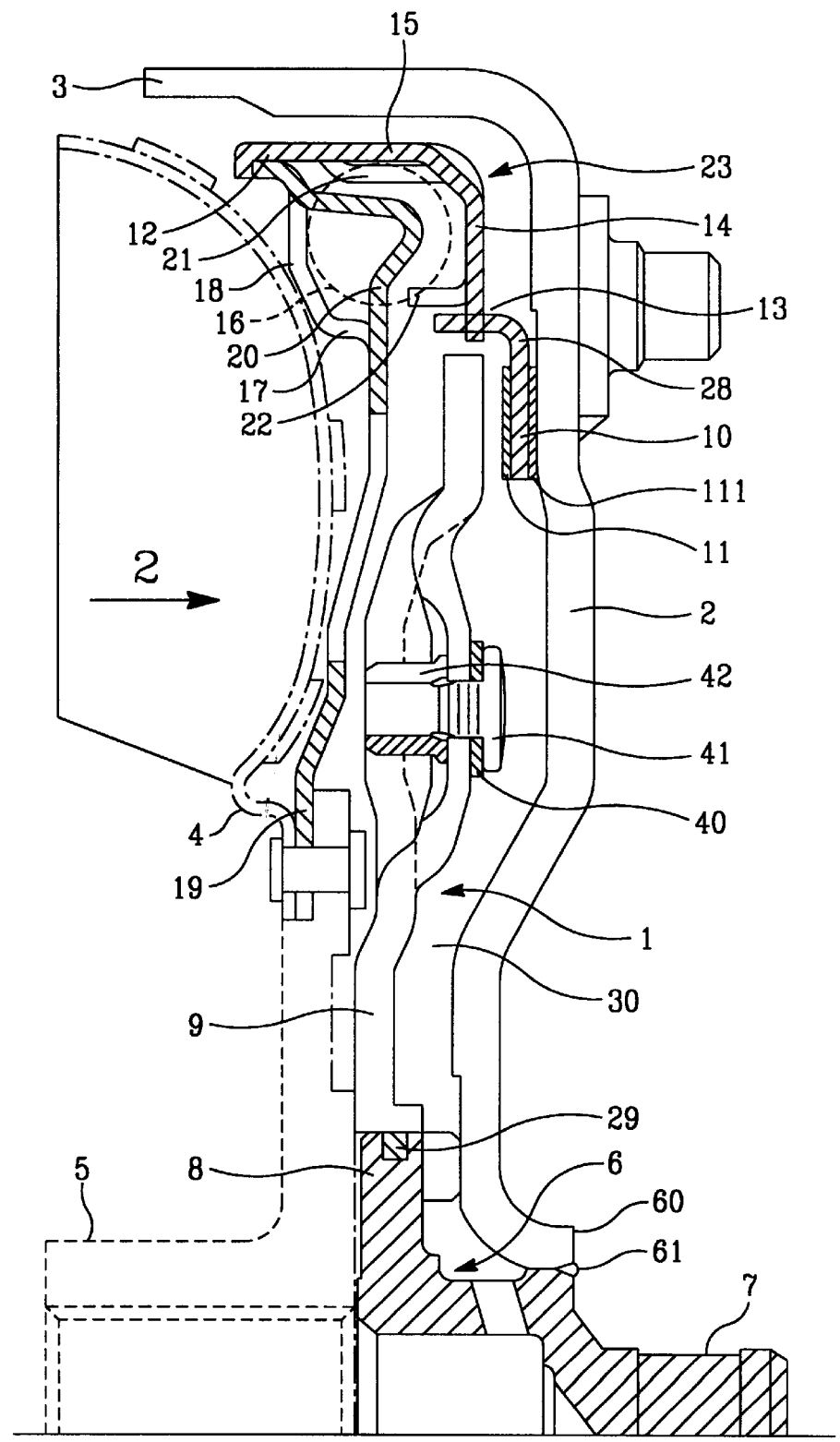
FIG. 1 is a half view in axial cross section of part of a hydrokinetic coupling apparatus in accordance with the invention.

As is known, and as is described in the document WO-A-94/07058, to which reference can be made for more detail, a hydrokinetic coupling apparatus includes, arranged in a common sealed housing, which is filled with oil and which constitutes a casing, a torque converter and a lock-up clutch 1.

The casing, which in this example is of metal, constitutes a driving element, and is adapted to be coupled in rotation to a driving shaft, namely the crankshaft of the internal combustion engine in the case of application to a motor vehicle.

The casing, which is of annular form, consists of two half shells, facing towards each other and sealingly secured together at their outer periphery, typically by welding.

The first half shell 2, 3 is adapted to be coupled in rotation to the driving shaft, and includes a generally transversely orientated annular wall 2 which is extended at its outer periphery by a generally axially orientated cylindrical wall 3.

The second half shell, which for simplicity, like the reaction wheel of the converter, is not shown, is so configured as to define an impulse wheel having blades which are fixed to the internal face of that half shell. These blades face towards the blades of a turbine wheel 4, which is secured by riveting or welding to a hub plate which is integral with a hub 5, the latter being splined internally for coupling it in rotation to a driven shaft, namely the input shaft of the gearbox in the case of application to a motor vehicle. This shaft is recessed internally so as to define a channel, which enables oil to reach a guide ring 6 fitted axially between the hub 5 and the transverse wall 2, and which is secured to the said wall 2.

This ring 6 is provided with a central centring nose 7 which projects axially, and the ring 6 is fixed centrally by a welded joint, the seam of which can be seen at 61 (FIG. 1) to the wall 2, which for this purpose has a central axially orientated sleeve portion 60 turned towards the outside, and into which the centring nose 7 penetrates. The ring 6 also has an integral, transversely orientated, collar portion 8. The ring 6 is therefore shouldered, and is in contact, through its collar portion 8 and after having been secured by welding, with the internal face of the wall 2 that faces towards the hub 5.

A piston 9 is mounted for axial sliding movement along the annular outer periphery of the collar portion 8, which is provided with a groove for mounting an annular sealing ring 29. The piston 9 has an axially orientated central sleeve portion which is turned towards the wall 2 for its sliding movement along the collar portion 8. The piston 9, together with the ring 6, the wall 2, and a disc 10, which carries friction liners 11 secured on each of its faces, for example by adhesive bonding, defines a variable volume chamber 30 which is fed through the ring 6, the latter having for this purpose apertures, not indicated by reference numerals, which are fed through the above mentioned channel in the driven shaft. In this example, the apertures are formed in the collar portion 8, and comprise inclined portions which are open into a blind hole formed centrally in the ring 6. The disc 10 is fitted at the outer periphery of the piston 9, and has lugs, radially outside the piston 9, at its outer periphery with an axially orientated portion, each of these lugs penetrating into a notch formed in a guide ring 12 at its inner periphery. The disc 10 is thus coupled in rotation to the guide ring 12, with axial mobility, through a coupling of the tenon and mortice type consisting of lugs and notches.

The notches are formed in a transverse portion 14 of the guide ring 12. This transverse portion 14 is extended by an annular portion 15, orientated axially and serving to retain, radially on the outside, coil springs 16 which are retained on the inward side by an annular retaining portion 17 of a plate element 18, which is extended radially inwardly by a radial web 19, the latter being secured by riveting to the radial plate portion of the hub 5 at the same time as the turbine wheel 4, which for this purpose has lugs, not shown, at its inner periphery.

In another version, this fastening may be obtained by welding. The web portion 19 has a set of holes (not shown) to allow oil to flow between the piston 9 and the wheel 4.

In another version, the plate element 18 may be secured to the turbine wheel 4 directly by welding.

The plate element 18 has engagement portions 20 for engagement by the circumferential ends of the springs 16. These portions 20 are formed in serpentine abutment bridges which extend from the inner periphery to the outer periphery of the retaining portion 17 of the plate element 18. This portion 17 is in the form of a half shell, and is offset axially with respect to the portions 14, 15 of the guide ring 12, which also constitutes a half shell. The guide ring 12 has in the region of its axial portion 15 integral inward deformations 21 for abutment with the ends of the springs 16. The portion 14 also has lugs 22 for abutment by the ends of the springs 16. For more detail, reference should be made to the document WO-A-94/1047058, and especially to FIGS. 24 to 28 of the latter.

It will be noted that, except for the sealing ring 29 and liners 11, the components of the hydrokinetic coupling apparatus are of metal, and are typically sheet steel pressings.

Thus, the lock-up clutch 1 comprises a torsion damper 23 which is located mainly between the turbine wheel 4 and the wall 2 at the outer periphery of the first shell, with an input part 12 disposed radially outwardly of the piston 9 and liners 11 and consisting of the guide ring 12 in the form of a half shell 14, 15, coil springs 16, and an output part which consists of the plate element 18, the latter being again in the form of a half shell, at its outer periphery.

The output part 18 is coupled in rotation to the turbine wheel 4, and in this example to the hub 5 of the latter, while the input part 12 is coupled in rotation to the disc 10, projecting radially with respect to the piston 9. The input part 12 is thus coupled releasably via the disc 10 and the liners 11 to the driving shaft, the said disc 10 with its liners 11 being adapted to be gripped releasably between the piston 9 and the wall 2, which constitutes a counter piston. The disc 10 is coupled resiliently to the hub 5 and to the wheel 4.

The turbine wheel 4 is driven in rotation by the impulse wheel, by virtue of the flow of fluid contained in the sealed housing or casing, and after the vehicle has been started, and in order to avoid any sliding effects between the turbine and impulse wheels, the lock-up clutch 1 provides direct solid coupling (or bridging) of the driven shaft with the driving shaft, this being obtained by gripping of the friction liners 11 and disc 10 between the piston 9 and the counter piston 2, with the driven shaft being driven directly by the half shell 2, 3.

In order to disengage (separate) the clutch 1, pressure is transmitted into the chamber 30 via the channel in the driven shaft, the blind hole in the ring 6 and the apertures in the latter. The said chamber 30 is sealed by means of the ring 29 carried by the collar portion 8.

In the engaged or bridged position of the clutch 1 (in which the liners 11 are gripped), the said chamber 30 is depressurised. This chamber 30 is accordingly bounded on the outside by the disc 10 and the liners 11, the piston 9 and the wall 2 each having at its outer periphery a flat (transverse) friction surface for the liners 11.

It will be noted that the piston 9 is coupled in rotation to the wall 2 of the first half shell 2, 3 by means of tangential resilient tongues 40, which are spaced apart circumferentially at regular intervals, there being in this example four sets of tongues (FIG. 3). These tongues 40 enable the piston to move axially. The tongues are attached to the transverse wall 2 through an interposed annular member 44, which in this example is of metal and which is fixed sealingly to the wall 2, in this case by means of rivets 45, which in the present example are integral with the latter, being formed for example by extrusion. At its inner periphery, the annular member 44 includes, from place to place, lugs 48 which are offset axially with respect to its main portion by which it is fastened to the wall 2. The tongues 40, which in this example consist of two tongues laid together, are fixed at their ends to the lugs 48 by means of rivets 43.

These tongues 40 extend generally tangentially with respect to a circumference of the assembly.

For the attachment of the other end of the tongues 40 to the piston 9, use is made of fastening means 41, 42, which, being adapted to extend generally through the tongues 40 and piston 9, comprise two parts, namely a first part 41 which is applied to the tongues 40 in advance, on the side of the latter opposite to the piston 9, and a second part 42, which only need to be on the same side as the piston 9 in order to engage with the first part 41. The tongues 40 lie within the space that extends radially between the friction liners 11 and the axis of the assembly, that is to say within the chamber 30 and axially between the wall 2 and the piston 9.

In the present case, the two-part fastening means 41, 42 is of the type having an upset bolt shank. The first part 41 comprises a shank with an engagement head in contact with the surface of the tongues 40 that faces towards the wall 2. The engagement head is disposed within the chamber 30. The shank passes, with a clearance, through the associated aperture in the piston 9, and comprises a smooth first portion and a notched first portion [sic]. This part 41 is fitted to the tongues 40 by force-fitting its smooth portion, or in another version by rolling or adhesive bonding.

The second part 42 consists of a seaming ring which includes, on the same side as the piston, a base portion of enlarged diameter, so as to prevent it from undergoing plastic flow into the through aperture in the piston. The second part is arranged on the side of the surface of the piston 9 opposite to the tongues 40, that is to say outside the chamber 30.

As will have been understood, the ring 42 is squeezed so that the latter will come into engagement with the notched portion of the shank 41. In another version, rivets of the POP type can be used.

In a further version, the first part may consist of a screw or a nut, which is secured, for example by adhesive bonding, to the lugs 40, the second part being in the form of a screw or a nut.

All of the arrangements described in the document FR 94 13205 filed on the Nov. 4th 1994 may be envisaged.

As is known, when the hydrokinetic coupling apparatus is driven in rotation, it causes the two said half shells to be inflated due to the presence of oil.

The transverse wall 2 of the first half shell inflates more towards the centre, that is to say in the region of the guide ring 6, which also acts as a feed ring for the chamber 30, than in the region of the disc 10.

The ring 6 therefore follows the movement of the wall 2, so that relative movement occurs between the piston 9 and the ring 6.

In order to overcome this drawback, the invention proposes to provide abutment means 50, facing towards the transverse wall 2 and carried by the said wall 2, in order to limit the movement of the piston 9 in a direction away from the transverse wall 2.

The piston 9 therefore follows the movement of the central portion of the wall 2, and is coupled with the ring 6.

Thus, the sleeve portion of the piston overlies the ring 29 under all circumstances, the latter therefore being protected. In addition, the movement of the piston 9 towards the web 19 and turbine wheel 4 is limited, so that it is possible to control the distance between the piston 9 and the liner 11 when the clutch 1 is disengaged.

It is possible to reduce the distance between the piston 9 and the liner 11 (FIG. 1) in such a way that the time of response for the gripping (bridging) of the clutch 1 is reduced.

Figure 2:
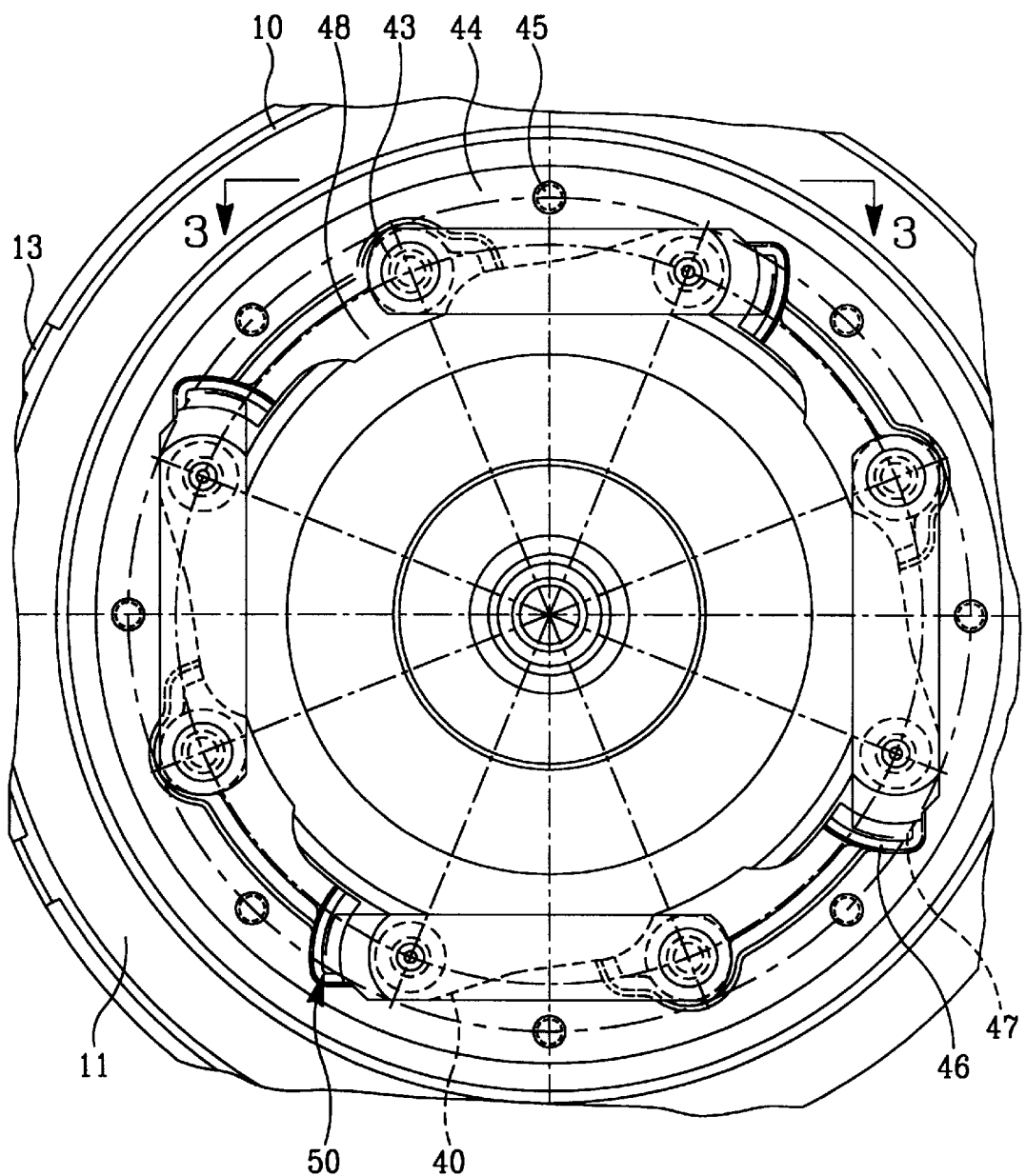
FIG. 2 is a view, shown partly cut away, in the direction of the arrow 2 in FIG. 1, showing the tongues.

In FIGS. 1 to 3, the said abutment means 50 are located in the chamber 30, and are formed in the member 44 by which the tongues 40 are fastened, the abutment means 50 being fixed to the wall 2. The tangential tongues 40 are in this example extended circumferentially at 47 beyond the two-part fastening 41, 42 that secures the tongues 40 to the piston 9.

The free end of each of the extensions 47 is adapted to cooperate with an abutment 46, which faces towards the wall 2 (FIGS. 2 and 3). This abutment 46 is part of the member 50 and extends locally parallel to the wall 2. It is press-formed in the lugs 48, which are offset axially with respect to the main portion of the annular member 44.

A lug 48 therefore has an end portion for fastening of a rivet 43, and an abutment 46.

Thus, going from the main portion of the member 44, the cross section is defined generally by cranked portions (or claws) with an axially orientated portion surrounding the free end of the tongues 40 (i.e. the extension 47), these being extended by a transversely orientated portion 46, constituting the abutment means in accordance with the invention and adapted to cooperate locally with the surface of the tongues 40 that faces towards the piston 9, that is to say with the dorsal face of the tongues 40.

In a modified version (FIG. 4), the head of the portion 41 of the fastening 41, 42 may be extended circumferentially at 147 so as to engage with the abutment 46.

In this case, the extension 147 has an axial extension which is adapted to cooperate with the abutment 46. It is therefore the dorsal face of the head of the part 41 which serves as a counter-abutment for the abutment 46.

In a further version, each head of the rivets 43 may be extended at 247 so as to constitute the abutment means 50. In this case the dorsal face of the tongues 40 is arranged to cooperate with the said extension 247, and more precisely with the surface of the latter which faces towards the piston 9.

It will be appreciated that in every case, the abutment means 50 enable the tongues 40 to be protected by limiting their deflection, especially when the lock-up clutch 1 is disengaged.

In addition, this solution has a short axial length because it acts within the chamber 30.

The hub 5 may therefore come very close to the ring 6. It will be appreciated that the position of the abutment 46 with respect to the said extension 47, 147, 247 is determined in such a way as to avoid any interference between the piston 9 and the web 19 and the hub 5.

In a further version, the fastening means 41, 42 may consist of simple rivets or screws or bolts.

To this end, a sub-assembly, consisting of the drive member 44, the tangential tongues 40, and the piston 9, is made up in advance.

The piston 9 of the sub-assembly is centred with the aid of a centring piece mounted in the sleeve portion 60, and the drive member is then fastened by laser welding to the transverse wall 2. This welding is carried out for example on the side of the surface of the transverse wall 2 which faces away from the piston 9. This weld extends through the thickness of the wall 2, and partly through the thickness of the drive member 44. The centring piece is then retracted, so that the guide ring 6 can be fitted and welded, at 61, to the sleeve portion 60.

The sub-assembly described above does of course include the abutment means in accordance with the invention.

As will be apparent from the drawings, the tangential tongues 40 and the drive member 44 are mounted radially in a region in which the transverse wall 2 extends in axial projection away from the piston 9 and away from the turbine wheel 4, with respect to the central portion of the said wall.

Thus the axial length between the piston 9 and the wall 2 is reduced in the region of the collar portion 8 of the ring 6, and use is made of the configuration of the wall 2 so as to locate the tongues 40 and the member 44 without increasing axial size.

The present invention is of course not limited to the embodiment described. In particular, the torsion damper 23 may take some other form, for example that which is described in the document U.S. Pat. No. 5,209,330.

In another version, one of the liners 11 may cooperate indirectly with the transverse wall 2.

In general terms, the liners 11 are gripped directly or indirectly between the piston and the wall 2.

In a further version, the friction liners 11, instead of being fixed to the disc 10 by adhesive bonding or brazing, may be fixed respectively to the piston 9 or to the wall 2, and this may be achieved for example by adhesive bonding or brazing, so that each friction liner is fixed to one of the elements, consisting of the piston and the transverse wall respectively, between which it is arranged to be gripped.

The structures of the coupling 13 may of course be reversed, with the disc 10 then having mortices in which tenons of the guide ring 12 are engaged.

In a further version, the disc 10 may be coupled by means of a coupling of the tenon and mortice type to a crown which is carried on the turbine wheel 4. In that case, the disc 10 is coupled rigidly to the turbine wheel 4.

In FIGS. 3 and 4, the number of abutments 46, 247 does of course depend on the application. Thus, certain of the tongues may be not associated with abutment means.

The seal 29 may be carried by the piston 9, and more precisely by the sleeve portion of the latter.

It will be noted that the abutment means are favourable to the production of a controlled sliding movement between the disc 10 and the assembly consisting of the piston 9 and the wall 2.

Thus the friction liners 11 may be provided with grooves, for cooling them during the said controlled sliding movement, such as is described for example in the document U.S. Pat. No. 5,339,230.

In a modified version, the grooves may be in the form of portions of a spiral.

The piston 9 may be coupled in rotation, with axial mobility, to the transverse wall 2 by means of a supplementary member which is riveted to the piston, in the manner described in the document U.S. Pat. No. 5,209,330.

In another version, the coupling may be provided by complementary splines, which act between the outer periphery of the collar portion 8 and the inner periphery of the central sleeve portion of the piston 9.

In all cases, the abutment means may consist of rivet heads fixed to the piston 9 and cooperating with abutment means analagous to the abutment means 46 in FIG. 3. These abutment means are then carried by a member similar to the member 44 in FIG. 3, the said member having no tongues, while the said rivets have a head with an extension similar to the extension 147 in FIG. 4. The rivets 43 may be omitted, with the tongues 40 then being integral with the member 44 being fixed to the piston 9 at their free ends by the fastening means 41, 42.

I claim:

1. A hydrokinetic coupling apparatus, comprising a generally transversely orientated wall (2), which is adapted to be coupled in rotation to a driving shaft and which carries a guide ring (6) fastened centrally on said wall, a piston (9) which is sealingly mounted for axial movement along the guide ring (6) and which defines, with said ring (6) and said transverse wall (2), a variable volume chamber (30) which is bounded on the outside by a disc (10), and friction liners (11) adapted to be gripped, respectively, between the piston (9) and the disc (10) and between the disc (10) and the transverse wall (2), each friction liner (11) being fixed to one of the elements consisting of the disc (10) and, respectively, the piston (9) and the transverse wall (2) between which the liner is adapted to be gripped, wherein abutment means (50), facing towards the transverse wall (2) and carried by the transverse wall (2), are provided for limiting the movement of the piston (9) in a direction away from the transverse wall (2), and wherein said abutment means (50) are fitted within said variable volume chamber (30).

2. Apparatus according to claim 1, wherein the piston (9) is coupled in rotation to the transverse wall (2), with axial mobility being provided by means of resilient tangential tongues (40) fixed to an annular member (44), which is itself fixed to the transverse wall (2), and in that the said abutment means (46) are press-formed in lugs (48) which are offset axially with respect to the main portion of the annular member (44), and which are part of the annular member (44).

3. Apparatus according to claim 2, wherein the tangential tongues (40) are extended circumferentially beyond their fastening to the piston (9), and in that the free end of the extensions is adapted to cooperate with the abutment means (46) which face towards the transverse wall (2) and which are fixed to the annular member (44).

4. Apparatus according to claim 3, wherein going from the main portion of the member (44), at least one cranked portion is defined generally in cross section with an axially orientated portion surrounding the free end of the tongues (40), the axial portion being extended by a transversely orientated portion defining the abutment means and adapted to cooperate with the dorsal face of the tongues (40) facing towards the piston (9).

5. Apparatus according to claim 1, wherein the piston (9) is coupled in rotation to the transverse wall (2), with axial mobility being provided by means of resilient tangential tongues (40) fixed to a member (44), which is itself fixed to the transverse wall (2), in that the tongues (40) are fixed by means of rivets (43) to lugs (48) which are offset axially with respect to the main portion of a member (44) that is fixed on the transverse wall (2), and in that the heads of the rivets (43) are extended (247) and are adapted to cooperate with the dorsal face of the tongues facing towards the piston (9).

6. Apparatus according to claim 2, in which the tongues (40) are fixed by means of rivets (43) to tongues (48) which are offset axially with respect to the main portion of the member (44) fixed on the transverse wall (2), and in which the tangential tongues (40) are fixed to the piston (9) by means of two fastening parts (41, 42), one of which (41) is fixed to the tangential tongues (40) and has a head, wherein the head of the said fastening part is extended circumferentially (147) and is adapted to cooperate with the abutment means (46) in the form of lugs.

* * * * *